Aug. 18, 1959    T. K. HUTCHINSON ET AL    2,899,723
SHELL MOLDING MACHINE

Filed April 2, 1956    5 Sheets-Sheet 1

FIG. 1

INVENTORS
THOMAS K. HUTCHINSON
O. C. KEMP HUTCHINSON
BY    ATT'Y.

Aug. 18, 1959 T. K. HUTCHINSON ET AL 2,899,723
SHELL MOLDING MACHINE
Filed April 2, 1956 5 Sheets-Sheet 2

INVENTORS
THOMAS K. HUTCHINSON
O. C. KEMP HUTCHINSON
BY
ATT'Y.

Aug. 18, 1959 T. K. HUTCHINSON ET AL 2,899,723
SHELL MOLDING MACHINE
Filed April 2, 1956 5 Sheets-Sheet 5

INVENTORS
THOMAS K. HUTCHINSON
O.C. KEMP HUTCHINSON
BY  Rey Eilers ATT'Y.

United States Patent Office 2,899,723
Patented Aug. 18, 1959

2,899,723
SHELL MOLDING MACHINE

Thomas K. Hutchinson and Oliver C. Kemp Hutchinson, Alton, Ill.

Application April 2, 1956, Serial No. 575,418

7 Claims. (Cl. 22—9)

This invention relates to improvements in molding machines. More particularly, this invention relates to improvements in molding machines that can form shell molds.

It is therefore an object of the present invention to provide an improved molding machine for making shell molds.

This invention is an improvement on the molding machine disclosed and described in our copending application Ser. No. 377,419, now Patent No. 2,804,661, issued September 3, 1957, which is entitled "Molding Machines" and which was filed August 31, 1953.

In making a shell mold, an admixture of sand and heat-responsive binder is placed on a heated pattern and left there long enough to interact and form the shell mold. The shell mold will usually be formed in a molding machine, and that machine will usually place an excess of sand and heat-responsive binder on the heated pattern; the excess of sand and binder making certain that a full-thickness shell mold is formed. Once the shell mold has been formed, the excess sand and binder are removed, and the shell mold is heated until it has cured. Where the shell mold is thin, the heat from the pattern can readily cure that mold; but where that mold is thick, the heat from the pattern is hard pressed to cure that mold. The present invention provides full and complete curing of even thick shell molds by simultaneously applying heat to the upper and lower faces of those molds. Where this is done, the heat applied to each face of a given shell mold need only travel one half the distance the heat would have to travel if all the heat was applied to just one face of that mold.

The present invention attains simultaneous heating of both faces of the shell mold by permitting that mold to remain on the heated pattern during the curing operation and by placing a heated oven adjacent that mold during the curing operation. That oven can not be set, and permanently held, adjacent the pattern, because the container for the admixed sand and binder must be moved adjacent that pattern to apply the admixed sand and binder. Consequently, the heated oven must be movable. Further, the movement of that oven must be interrelated with the movement of the container for the admixed sand and binder so the two do not collide. It is therefore an object of the present invention to provide a heated oven which can be moved into and out of proximity to a heated pattern of a shell molding machine while the sand-carrying container of that machine is out of proximity to that pattern.

The patterns used in the shell molding machine of the present invention may be made with tall projections, and it is therefore important that the heated oven follow a path that is substantially normal to the face of those patterns whenever that oven is adjacent those patterns. Where that is done, there is little or no risk of the oven striking those projections or those portions of the shell molds overlying those projections. This arrangement thus protects the patterns, the shell molds and the oven from injury.

The present invention affords still further protection for the patterns, the shell molds and the oven by providing a safety switch that is actuated solely by the oven or by the equipment that moves the oven and by mounting that switch so it is actuated only when the oven is spaced away from the patterns. That switch is a part of the circuit of the motor which drives the pattern mount; and until the oven, or the equipment associated with the oven, closes that switch the pattern mount cannot be moved. In this way, the present invention makes certain that the pattern mount cannot move until the oven and the oven-supporting structure are safely out of the path of the pattern mount and of the pattern thereon.

In one form of the present invention, the heated oven is moved into proximity to the heated pattern by compressed air and by its own weight and is moved out of proximity to that heated pattern by a spring. The compressed air will coact with the weight of the oven to overcome the force of the spring, and the compressed air and the weight of the oven will stress the spring as the oven is moved close to the heated pattern. When the compressed air is vented, the spring will immediately start the oven moving upwardly and away from the pattern. The spring is able to exert a force that is many times greater than the force which gravity exerts on the oven; and therefore the oven will move quickly. This arrangement is desirable because prompt movement of the oven will avoid a collision between the pattern, the shell mold, the pattern mount and the heated oven.

The movement of the heated oven upwardly and away from the pattern under the action of a spring is very desirable since a stressed spring applies maximum force immediately, whereas a compressed air cylinder cannot. Thus, the compressed air cylinder cannot move its piston until sufficient air has been introduced into the cylinder to fill it and to build up the pressure therein to the point where the piston can overcome the external forces acting upon it. The said one form of the present invention takes full advantage of this difference between the actions of a spring and a compressed air cylinder by using a spring to move the heated oven away from the pattern and by using a compressed air cylinder to raise the stripper pins. The prompt acting spring will move the oven upwardly and out of the way before the slower acting air cylinder can strip off the shell mold, thereby keeping that mold from striking, and being injured by, the oven. It is therefore an object of the present invention to move the oven of a shell molding machine away from the pattern of that machine by a spring and to strip off the molds of that machine by a compressed air cylinder.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

Referring to the drawing in detail, the numeral 10 denotes a side plate of one form of shell molding machine that is made in accordance with the principles and teachings of the present invention. The other side plate of that form of shell molding machine is denoted by the numeral 12. The side plates 10 and 12 are held in rigidly spaced relation by structural elements, not shown, at the bottoms thereof.

The side plates 10 and 12 are mounted on opposite sides of a pattern mount that includes side brackets 16. Those brackets are generally rectangular in configuration but they are formed with projections 17 on them. The brackets 16 are held in rigidly spaced relation by channels 18; the brackets 16 and the channels 18 being suitably connected together, as by welding. A bearing housing, not shown, will be mounted in an opening in the side plate 10; and that bearing housing will be similar to the bearing housing in our application for Molding Machines (A) filed of even date and bearing Serial No. 575,417. An antifriction bearing, not shown, will be held by the bearing housing mounted on side plate 10, and that bearing will support a shaft which is secured to one of the side brackets 16 of the pattern mount. The other side bracket 16 of the pattern mount will have an internal annular gear, not shown, on it; and a combined gear and coupling will extend between that annular gear and the hollow motor shaft 14. The internal annular gear and the combined gear and coupling are similar to the annular gear and combined gear and coupling in said application for Molding Machines (A); and they coact with the hollow motor shaft 14 to rotatably support the other side bracket 16. In this way the pattern mount is held for rotation between the side plates 10 and 12.

A compressed air cylinder 20 is mounted below the level of the pattern mount by a bracket 22 which extends between and is secured to the lower flanges of the channels 18 of that pattern mount. The bracket 22 is U-shaped in cross section and it has a central opening in the web thereof. The cylinder 20 is positioned in that opening of bracket 22, and that cylinder is provided with a gland 24 that overlies the opening-defining portions of bracket 22. The gland 24 encircles a piston 26, and it has a groove for an O-ring or other packing. The piston 26 has an annulus 23 at the lower end thereof; and that annulus is sealed to the piston by an O-ring or by packing held in a groove in the piston. The annulus 23 has a groove in it; and that groove receives a compression ring, not shown, which bears against the inner surface of the cylinder 20. A plate 25 underlies the annulus 23 and maintains it in assembled relation with the piston 26. Screws, not shown, extend through openings in the gland 24 and seat in threaded openings in the bracket 22. Bolts 31 extend through other openings in gland 24 and through openings in the bottom plate of cylinder 20, thereby maintaining the gland 24 and the cylinder 20 in assembled relation. A platform 27 is mounted on the upper end of the piston 26, and that platform receives spacers 33 on the bottom of stripper plate 35. Four spacers 33 will usually be provided, and at least two of those spacers will have threaded openings in the bottoms thereof. Screws will pass through openings in the platform 27 and seat in the threaded openings in the bottoms of the spacers 33. Stripper pins 37 are carried by the stripper plate 35, and a motion-limiting bolt 39 is carried by the platform 27. The stripper pins extend into the pattern plate 32, and the bolt 39 extends through an opening in the bracket 22; the head of that bolt being larger than that opening and preventing undue upward movement of platform 27.

A broad guard 28 extends from the outer ends of the bracket 22 and engages the bottom plate of the cylinder 20. That guard protects the operator from direct contact with the cylinder 20 or the bolts 31 used with that cylinder.

A pattern-receiving frame 30 is mounted on the upper flanges of the channels 18 of the pattern mount, and that pattern-receiving frame has a shoulder at its inner edge and has a centrally located support to receive and hold the pattern plate 32. A pattern-clamping frame 36 has a configuration similar to that of the pattern-receiving frame, and it overlies and engages the upper face of pattern plate 32. Aligned openings, not shown, are provided in the upper flanges of channels 18 and in the frames 30 and 36; and nuts and bolts coact with those openings to secure the pattern plate and its frames to the pattern mount.

A shaft 38 extends between projections 17 on the side brackets 16 of the pattern mount, and that shaft telescopes through a guiding sleeve 34 secured to arms 40. That shaft also extends through openings in the arms 40 in register with the sleeve 34. Those arms resiliently support a container 42 for admixed sand and binder, all as explained in said application for Molding Machines (A). Plates 44 are secured to the exterior of the container 42, and stub shafts 46 are carried by the plates 44. Those stub shafts rotatably support grooved wheels 48, and those grooved wheels rest upon and are guided by tracks 50. Those tracks are held in fixedly spaced relation relative to the side plates 10 and 12 by spacers 52.

An upper manifold 43 and a lower manifold 45 are suitably secured to the pattern mount by angles 47 and bolts and nuts 49. Burner tips 51 are mounted in the upper manifold 43, and those tips direct flame into the area below the pattern plate 32. A sheet 53, of some non-tarnishing metal, such as stainless steel, is backed by a sheet 55 of thermal insulation such as asbestos. Those sheets are held in spaced relation below the pattern plate 32 by spacers 57 which are enclosed by sleeves 58 of thermal insulation. The sheets 53 and 55 define the bottom of a side-heated oven; and the pattern plate 32 constitutes the top of that oven. That plate will be heated thoroughly and uniformly by the combustion of the pre-mixed fuel and air issuing from the burner tips. The pre-mixed fuel and air will pass through the hollow shaft mounted in the bearing housing on side plate 10; and it will be conducted to the lower manifold 45 by a duct, not shown.

Figure 1:
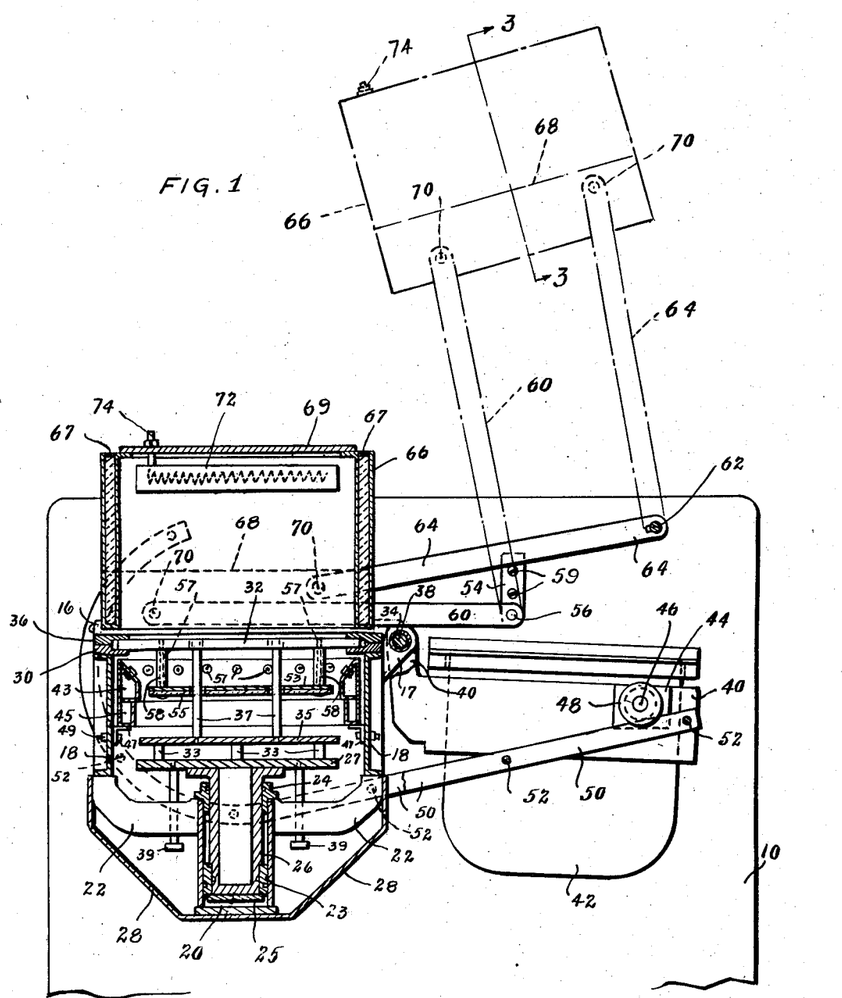
Fig. 1 is a partially broken, partially sectioned side view of one form of shell molding machine that is made in accordance with the principles and teachings of the present invention.
Figure 2:
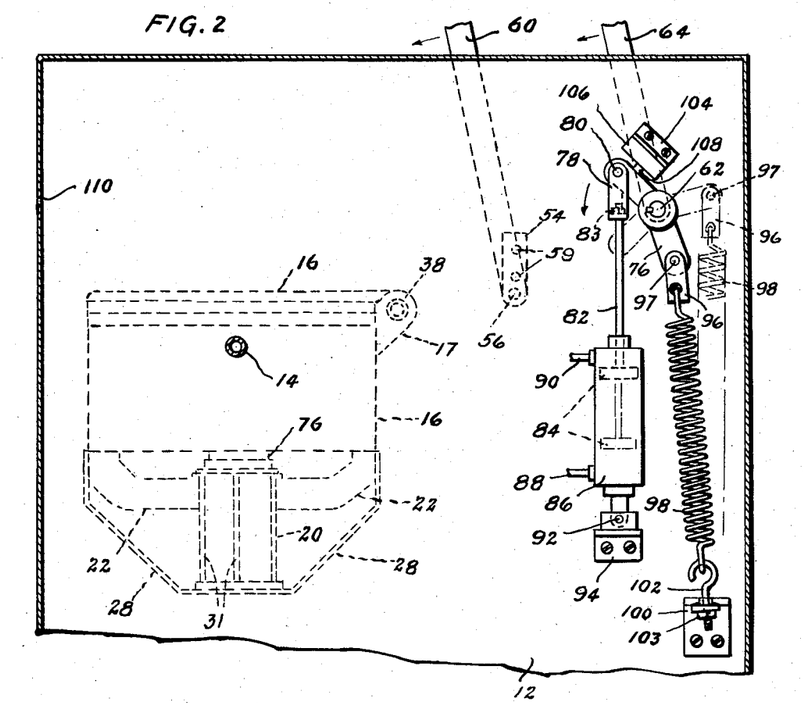
Fig. 2 is another partially sectioned, partially broken away view of the said one form of shell molding machine.
Figure 3:
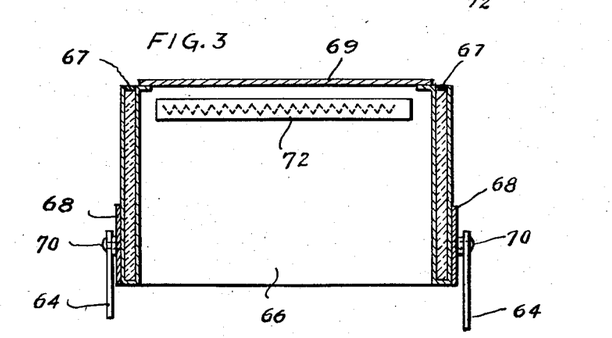
Fig. 3 is a sectional end view of the oven of the shell molding machine of Figs. 1 and 2, and it is taken along the plane indicated by the line 3—3 in Fig. 1.

Rotation of the hollow motor shaft 14 in the clockwise direction in Fig. 2 will cause the container 42 to engage the pattern plate 32, and continued rotation of that motor shaft in the clockwise direction will cause the container 42 to become inverted and to apply a mixture of sand and binder to the heated pattern plate 32. Rotation of the shaft 14 in the counter clockwise direction will restore the elements of the shell molding machine to the positions shown in Fig. 1. The container 42 is usually referred to as a dump box or investment box, and it "dumps" its sand and binder onto the pattern plate when it is inverted.

A pivot bracket 54 is secured to the side plate 10 by screws 59. A similar pivot bracket is secured to the side plate 12 by screws 59. Each of these pivot brackets carries a pivot 56, and arms 60 are rotatably supported by those pivots. A rotatable shaft 62 is suitably supported by bearings, not shown; and that shaft extends between the side plates 10 and 12 of the shell molding machine. Arms 64 are keyed to the shaft 62, and those arms rotate with that shaft as a unit. The arms 60 are longer than the arms 64. An oven 66 is formed of sheet metal and thermal insulation. The walls of the oven are hollow and are made of sheet metal; those walls being U-shaped in cross section. Granular thermal insulation is poured into the spaces defined by those hollow walls, and closure plates 67 are pressed down into the spaces defined by the open ends of the U-shaped walls. The upper edges of the inner sections of the walls of the oven 66 are flanged inwardly and a top plate 69 is suitably secured to those flanged edges, as by welding.

Mounting plates 68 are suitably secured to the sides of oven 66, as by welding. Pins 70 are secured to the mounting plates 68, and those pins extend through openings in the free ends of the arms 60 and 64. The arms 60 and 64 constitute a generally parallel linkage that supports the oven 66.

The oven 66 is shown as being provided with an electric heating unit 72. That unit has its own frame, and it has insulators, not shown, to suitably support its coils of resistance wire. Terminals 74 are provided for the heating unit 72; and those terminals project through the cover plate 69 of the oven 66. Leads, not shown, will be secured to the terminals 74, and those leads will be connected to a suitable source of electric current, not shown. The terminals 74 will be suitably insulated from the cover plate 69 of the oven.

In mounting the oven 66, the upper of the screws 59, in the sets of screws 59, are set in position and drawn up fairly tightly. Thereafter, the free ends of the arms 60 and 64 are rotated downwardly, as by rotating the shaft 62 in the counterclockwise direction in Figs. 1 and 2. That rotation will move the oven 66 down close to the pattern plate 32; and thereupon the brackets 54 will be shifted slightly about the upper of the screws 59 until the bottom of the oven 66 is generally parallel to the top of the pattern plate 32. The positions of the lower openings in the brackets 54 are marked, and thereafter openings are drilled and tapped at those positions. Those threaded openings receive the lower of the sets of screws 59. Theoretically it would be possible to drill all of the holes for the screws 59 from a template, but for precise mounting of the oven, the cut and try method described herein is best.

The shaft 62 is positioned above the level of the pivots 56; and this is desirable because it cants the oven 66 so its generally vertical axis is directed rearwardly and away from the pattern mount when the oven is in raised position. This rearward direction of the axis of the oven 66 avoids needless heat for the operator of the shell molding machine. That operator has to reach in and remove the molds after they have been stripped from the pattern plate 32; and if the oven 66 was not canted rearwardly and away from that plate, the operator would receive the heat radiated through the open bottom of that oven.

As indicated particularly in Fig. 2, a crank arm 76 is keyed to the rotatable shaft 62; and a connector link 78 is pivoted to one end of the crank arm 76 by a pin 80. The elongated shank 82 of a piston 84 is telescoped through an offset portion of the connector link 78; and a nut 83 prevents the separation of the shank 82 from the connector link 78. The shank 82 extends through a packing gland in the end of an air cylinder 86. The piston 84 has a sliding, but substantially air-tight, fit with the inner surface of the cylinder 86. Conduits 88 and 90 conduct air to and from the cylinder 86. A pivot 92 is formed on the lower end of the cylinder 86, and that pivot is held by a pivot bracket 94 mounted on the side plate 12. The pivot 92 permits the cylinder 86 to rotate relative to the side plate 12 while holding that cylinder in assembled relation with that side plate.

A connector link 96 is secured to the other end of the crank arm 76 by a pin 97. An elongated helical spring 98 extends through an opening in the lower end of the connector link 96. A bracket 100 is mounted on the side plate 12 by fasteners, as for example screws; and a hook bolt 102 extends through an opening in an offset portion of that bracket. A nut 103 is threaded onto the lower end of the hook bolt 102, and that nut maintains that hook bolt in assembled relation with the bracket 100. Rotation of nut 103 on bolt 102 adjusts the tension in spring 98.

The normal position of the crank arm 76 is shown by solid lines in Fig. 2, and the oven-lowering position of that arm is shown by dotted lines in Fig. 2. When the crank arm 76 is in oven-lowering position, the angle between that arm and the axis of spring 98 enables that spring to apply substantially maximum torque to that arm and thus to shaft 62. Hence, whenever the oven 66 is in lowered position, the spring 98 is applying substantially maximum restoring torque to that oven.

A switch-mounting bracket 104 is suitably secured to the side plate 12, as by screws. The bracket supports a switch 106; and that switch has a button 108 which is biased for movement outwardly of the housing of said switch. The button 108 of the switch 106 is in the path of the said one end of crank arm 76. When that crank arm is in the position shown by solid lines in Fig. 2, and the oven 66 is spaced upwardly and away from the pattern on the pattern mount, the contacts of switch 106 are closed. However, when the crank arm 76 is in the position shown by dotted lines in Fig. 2, and the oven 66 is adjacent the pattern on the pattern mount, the contacts of switch 106 are open. The contacts of that switch are in the circuit of the motor which has the shaft 14 and which rotates the pattern mount; and only when the contacts of switch 106 are closed can that motor be operated.

The numeral 110 denotes a housing which is mounted on the side plate 12 and which encloses and protects the crank arm 76, the switch 106, the spring 98, the cylinder 86 and the shank 82 of piston 84. That housing also protects passersby from engagement with any of the foregoing parts. In addition, that housing encloses and protects the said motor and the other control equipment associated with that motor.

The normal position of the component parts of the shell molding machine of Figs. 1 and 2 is shown by dashed lines in Fig. 1 and by solid lines in Fig. 2. When those parts are in that position, the oven 66 is spaced away from the pattern mount, and the contacts of switch 106 are closed. Hence the motor which rotates the shaft 14 and the pattern mount connected thereto can be energized. Energization of that motor is initiated by a push button, not shown, and it causes the pattern mount to rotate in the clockwise direction; and full rotation of that pattern mount causes the container 42 to apply the mixture of sand and binder to the pattern on the pattern mount. The pattern will be heated by the burning of the fuel issuing from the burner tips 51, and that pattern will interact with the sand and binder to form the shell mold. That mold will remain on that pattern as the container 42 is moved away from the pattern, as by counterclockwise rotation of the shaft 14 and of the pattern mount. The heat in the pattern will help cure the mold but additional heat is desired. That heat is provided by the heating element 72 in the oven 66; and that oven is moved downwardly into the position shown by solid lines in Fig. 1 to insure efficient heating of the upper face of the shell mold.

The oven 66 is moved to the lowered position shown by solid lines in Fig. 1 by applying compressed air to cylinder 86 through the conduit 90 and by venting air through the conduit 88. This compressed air applies a downward thrust to the plunger 84 and to the shank 82 thereof; and that downward thrust acts through crank arm 76 to rotate shaft 62. The rotation of shaft 62 will be in the counterclockwise direction, and it will rotate arms 64 in the counterclockwise direction. Those arms will force the oven 66 and the other set of arms 60 to move to the lowered position shown by solid lines in Fig. 1. The stroke of the plunger 84 is dimensioned so it will move the oven 66 down immediately adjacent the pattern clamping frame 36 but will not force that oven into engagement with that frame or the pattern held thereby.

At the conclusion of the curing step, and that step will be timed by a suitable timing device, not shown, a solenoid valve, not shown, will open and permit air to vent from the conduit 90. Thereupon, the spring 98, which was stressed during the downward movement of the plunger 84, will pull down on the other end of the crank arm 76 and rotate the shaft 62 in the clockwise direction. Thereupon, the oven 66 will promptly move up to the position shown by dotted lines in Fig. 1. In this latter position, the oven 66 and the arms 60 and 64 are out of the path of the container 42 and out of the path of the pattern mount.

Once the oven 66 has been moved out of the position shown by solid lines in Fig. 1 and into the position shown by dotted lines in Fig. 1, the stripper pins can be raised upwardly by the piston 26, platform 27, spacers 33 and stripper plate 35. Thereafter, the shell molding machine is ready for another cycle; and that cycle can be begun immediately because the crank arm 76 re-closed the switch 106 when the oven 66 moved to the position shown by dotted lines in Fig. 1.

The timing device for the shell molding machine will provide a slight time interval between the venting of the air from the conduit 90 and the application of compressed air to the bottom of piston 26. However, that time interval can be quite short since the spring 98 will move the oven promptly, while the compressed air must build up in the cylinder 20 before it can move the piston 26.

The pins 56 and the shaft 62 are spaced to the right of the normal position of the pattern mount, and they are disposed only short distances above the level of that pattern mount. Consequently the arms 60 and 64 move the oven 66 in a dominantly vertical direction whenever that oven is closely adjacent the pattern mount. This is very desirable since it enables that oven to move without striking tall projections on the pattern plate 32.

While the oven 66 is shown as being heated by the electric heating unit 72, that oven could just as well be heated by a gaseous fuel. Such an oven is shown in Figs. 4–6.

Figure 4:
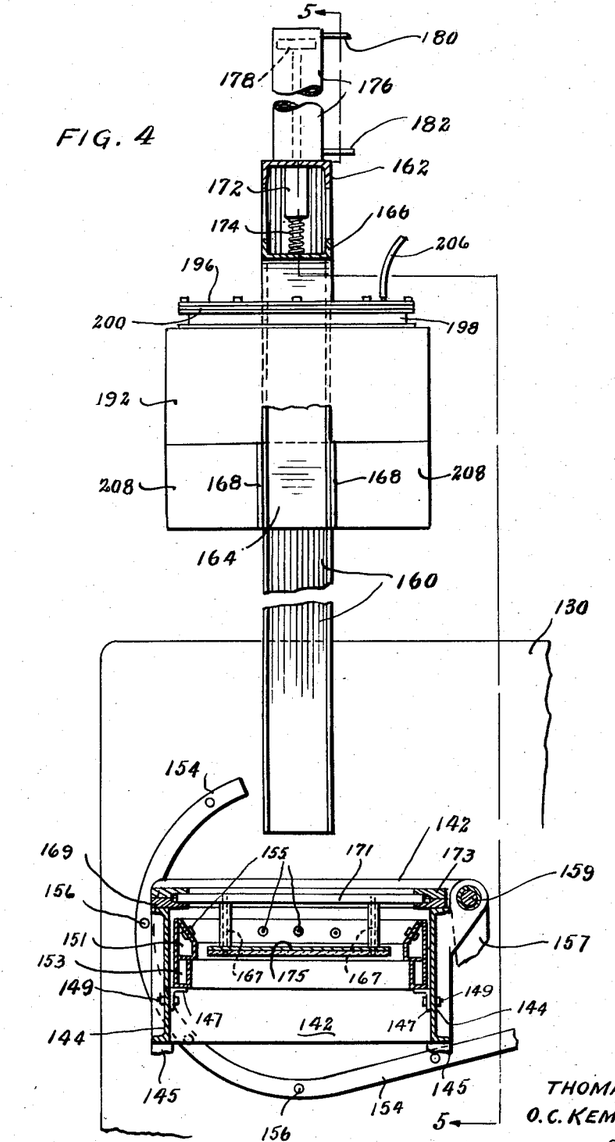
Fig. 4 is a partially sectioned partially broken away side view of another form of shell molding machine that is made in accordance with the principles and teachings of the present invention.
Figure 5:
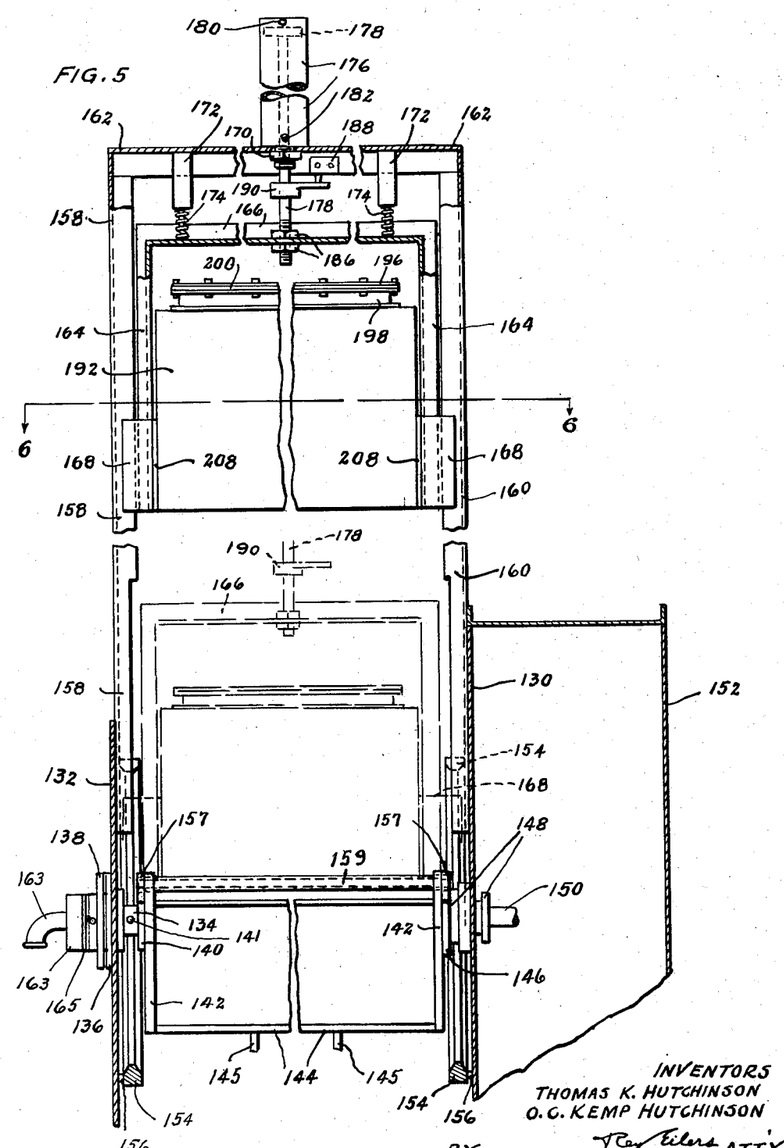
Fig. 5 is an end view of the shell molding machine of Fig. 4, and it is taken along the broken plane indicated by the line 5—5 in Fig. 4.
Figure 6:
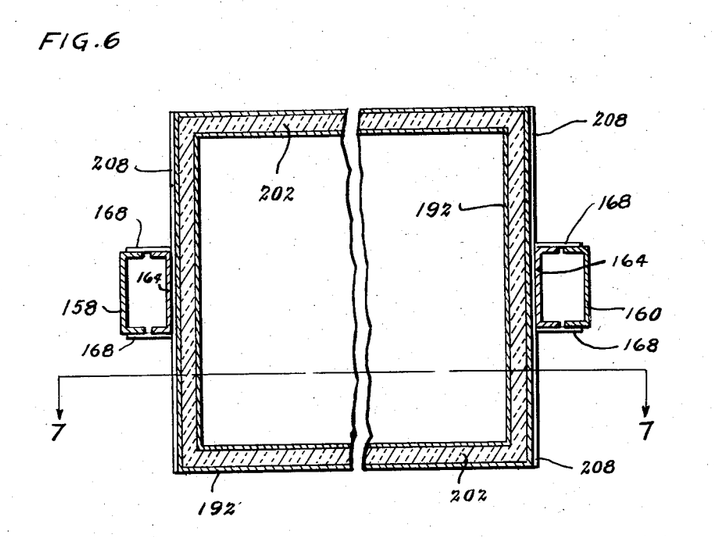
Fig. 6 is a sectional view in plane of the oven and oven-guiding apparatus of Figs. 4 and 5, and it is taken along the plane indicated by the line 6—6 in Fig. 5.
Figure 7:
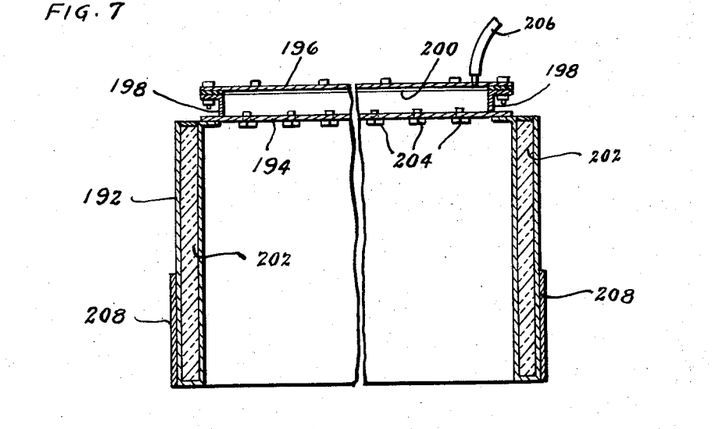
Fig. 7 is a sectional view of the oven of Fig. 6, and it is taken along the plane indicated by the line 7—7 in Fig. 6.

Figs. 4–6 show a modified form of shell molding machine provided by the present invention. That shell molding machine has side plates 130 and 132 which are comparable to the side plates 10 and 12 of the shell molding machine of Figs. 1 and 2. A hollow shaft 134, which is similar to the hollow shaft for our said application for Molding Machines, is supported by an anti-friction bearing, not shown, held in the bearing housing 136. That bearing housing is mounted in an opening in the side plate 132; and that bearing housing projects outwardly from each face of that side plate. A retaining plate 138 is secured to the bearing housing 136, and that plate holds the anti-friction bearing in position within that housing. The retaining plate 138 is annular in configuration, and it telescopes over the outer end of the shaft 134. A radially directed flange 140 is provided on the inner end of the shaft 134, and that flange is secured to one of the two side brackets 142 of the pattern mount. That pattern mount, which is comparable to the pattern mount of the shell molding machine of Figs. 1 and 2, has two channels 144 extending between and connecting the side brackets 142. The channels 144 coact with those side brackets to provide a rigid mount for the patterns. A bracket 145 which is identical to the bracket 22 of the shell molding machine of Figs. 1 and 2 is shown in part in Figs. 4 and 5; and that bracket supports an air cylinder, not shown, that is identical with the air cylinder 20 of that shell molding machine. Air is conducted to that air cylinder by a conduit that is connected to the air outlet opening 141 of shaft 134. That opening communicates with the air inlet opening of bearing housing 138 by reason of an axially directed passage, not shown, in the wall of the hollow shaft 134.

An internal annular gear 146 is rigidly secured to the outer face of the right hand side bracket 142 of the pattern mount, as that pattern mount is viewed in Fig. 5. The teeth of that gear engage and are driven by the teeth on the gear section of a combined gear and coupling 148. That combined gear and coupling is annular in configuration and it receives the projecting end of a hollow motor shaft 150. A keyway, not shown, is provided at the inner surface of the gear and coupling 148; and that keyway receives a key, not shown, which is seated in a keyway in the shaft 150. The gear and coupling 148 coact with the internal annular gear 146 to provide a driving connection between the motor and the pattern mount that will operate satisfactorily despite minor misalignments between the axes of that motor and that pattern mount.

The pattern mount is equipped with an upper manifold 151 and a lower manifold 153 which are identical with the upper and lower manifolds 43 and 45 of the shell molding machine of Figs. 1 and 2. Those manifolds are secured to the channels 144 by angles 147 and bolt and nut combinations 149. Burner tips 155 are seated in the upper manifold 151, and pre-mixed fuel and air passes through the manifolds 153 and 151 to those burner tips. The pre-mixed fuel and air initially conducted to the street L 161 that is mounted in the end face of housing 163. That housing is sealed to the bearing housing 138 by a gasket 165; and hence the pre-mixed fuel and air will pass inwardly through the hollow shaft 134. A duct, not shown, extends between the inner end of shaft 134 and the lower manifold 153.

A pattern-receiving frame 169 is placed on the upper flanges of the channels 144, and that frame accommodates pattern plate 171. A pattern clamping frame 173 overlies the pattern plate 171; and bolts extend through aligned openings in frames 169 and 173 and in the upper flanges of channels 144 to secure those frames to those channels. Sleeve-encased spacers 167 are seated in pattern plate 171, and they hold an asbestos-backed metal plate 175 in spaced relation below the pattern plate 171. The plate 175 and pattern plate 171 constitute the top and bottom of a side heated oven.

A housing 152 is secured to the outer face of the side plate 130. That housing will enclose and protect the motor of which the shaft 150 is a part. That housing will also protect control equipment, not shown, for that motor and for other components of the shell molding machine.

A track 154 that is partially arcuate and partially straight is mounted adjacent the inner face of the side plate 130 by spacers 156. A similar track is mounted adjacent the inner face of the side plate 132, and that second track is also supported by spacers 156. These tracks support grooved wheels, not shown, that are carried by arms 157. Those arms are rotatably supported by a shaft 159 which is carried by projections on the side brackets 142 of the pattern mount. The arms 157 resiliently support a container, not shown, for admixed sand and binder; and that container is usually referred to as the dump box or investment box. The grooved wheels follow the tracks 154 and will guide the container for rotation into engagement with the pattern plate 171 carried on the pattern mount. At the conclusion of this rotation, the container applies admixed sand and binder to the heated pattern plate 171. After that plate has heated the binder and sand sufficiently to cause a shell mold to form, the container will rotate through its path of movement in the opposite direction and will return to its initial position. Thereafter the shell mold is cured.

The numeral 158 denotes a vertically directed channel which has its web secured to side plate 132 in any suitable manner, as for example by welding, bolting or the like. The lower edges of the flanges of the channel 158 are cut away to provide clearance for the container, for the arms 157, and for the pattern mount as they rotate. A similar vertical channel 160 is secured to the inner face of the side plate 130. The two channels 158 and 160 are of the same height and their flanges are in confronting relation. The upper ends of the channels 158 and 160 are rigidly connected together by a horizontally directed channel 162. That channel can be suitably secured to the upper ends of the channels 158 and 160 by welding, bolting or the like.

Two lengths of channel 164 are used as supports for an oven. The webs of the channels 164 are of the same width as the webs of channels 158 and 160; and hence the flanges of channels 164 are in register with the flanges of the channels 158 and 160. A horizontally directed channel 166 extends between the channels 164; and the ends of channel 166 are suitably secured to those channels, as by welding, bolting or the like. Plates 168 are secured to the flanges of the channels 164, and those plates are disposed adjacent the outer faces of the flanges of channels 164 and hence they guide the movement of the channels 164 and 166 relative to the vertical channels 158 and 160.

A pair of rods 172 are secured to the web of channel 162; and those rods have reduced-diameter lower ends. Those lower ends receive and hold the upper ends of helical springs 174; and those springs are longer than the reduced diameter portions of rods 172. Consequently, the lower ends of the helical springs 174 project a considerable distance downwardly below the lower ends of rods 172.

A pneumatic cylinder 176 is secured to the web of channel 162, as by a nut 170 that threads onto a threaded annulus on that cylinder. That cylinder has a plunger 178 therein, and that plunger moves in response to air that is introduced into, or vented from, the conduits 180 and 182 of that cylinder. The shank of the plunger 178 is threaded at its lower end, and that lower end extends through an opening in the web of channel 166. Nuts 186 are threaded onto the lower end of the shank of plunger 178 on opposite sides of the web of channel 166; and those nuts fixedly secure the plunger 178 to channel 166.

A safety switch 188 is mounted on one of the flanges of channel 162, and an actuating arm 190 on the shank of plunger 178 is in register with the actuating button of that switch. The arm 190 will close the switch 188 whenever the channel 166 is in the raised position shown in Figs. 4 and 5. When that channel is in its lowered position, as indicated by dotted lines in Fig. 5, the switch 188 will be open. That switch is in the circuit of the motor of which shaft 150 is a part; and when that switch is open, that motor can not be energized. However, when that switch is closed, that motor can be energized.

The numeral 192 denotes the sheet metal wall of an oven; and that wall is U-shaped in vertical section. The upper edge of the inner portion of that wall is flanged inwardly, and a plate 194 of metal is suitably secured to that flanged inner portion by welding. That plate has a number of burner tips 204 mounted in openings in it. Four angles 198 are seam welded to the plate 194 adjacent the edges of that plate, and a plate 196 is bolted to the horizontally-directed portions of the angles 198. A gasket 200 is disposed between the plate 196 and the angles 198; and that gasket coacts with the plate 194, angles 198 and plate 196 to form a manifold for pre-mixed fuel and air. Granular insulation 202 is placed in the hollow wall 192; and that insulation will reduce heat losses from the oven. A flexible conduit 206 is suitably connected to a pipe fitting seated in an opening in the plate 196. That conduit will be connected to a fixed conduit, not shown, mounted on one of the side plates; and the flexible nature of conduit 206 will permit vertical movement of the oven relative to the vertical channels 158 and 160.

Vertical movement of the oven is provided by securing that oven to the channels 164. This is done by welding plates 208 to the outer portions of wall 192 and to the webs of channels 164. As indicated above, the channels 164 are connected to the channel 166, and that channel is moved up and down by compressed air in cylinder 176.

In the operation of the structure shown in Figs. 4–7, the motor which drives the shaft 150 can not be energized unless the switch 188 is closed; and that switch is closed only when the oven is in the raised position shown by solid lines in Figs. 4 and 5. That motor will rotate the shaft 150 and cause the pattern mount to rotate in a clockwise direction as that pattern mount is viewed in Fig. 4. That rotation causes the pattern mount to move three hundred and sixty degrees, and it causes the container to engage the pattern-clamping frame 173 and thereafter become inverted. In its inverted position, the container applies the admixed sand and binder to the heated pattern plate 171. After a short period of time, the pattern mount and the container are rotated in the opposite direction and are rotated back to their initial position. At this time, a shell mold will be lying on the heated pattern but that mold will be in need of curing. The heat for the curing step will come, in part, from the heated pattern plate 171, but the rest of that heat will come from the oven. That oven is heated by the burning fuel which issues from the nozzles 204. The oven is moved down into proximity to the heated pattern plate 171 by applying compressed air to the cylinder 178 through the conduit 180. After a predetermined period of time, the compressed air is directed to the conduit 182, and air is permitted to vent from the conduit 180. The air for the cylinder 176 can be directly connected to that cylinder by substantially inflexible lines since the cylinder 176 is held stationary throughout the operation of the device. As soon as the plunger 178 starts downwardly in the transporting of the oven toward the pattern plate 171, the switch 188 opens and prevents any rotation of the motor and motor shaft 150. This protects the pattern mount, the pattern, and the shell mold from a collision with the oven.

Whereas two preferred embodiments of the present invention have meen shown and described in the drawing and accompanying description it should be apparent to those skilled in the art that various changes may be made in the form of the invention without affecting the scope thereof.

What we claim is:

1. In a shell molding machine that can be operated to apply admixed binder and sand to a heated pattern to form a shell mold and wherein that shell mold is cured before it is stripped from said pattern, a frame adjacent which an operator takes his position in operating said machine, a pattern mount to support said pattern, an oven, a support for said oven that moves said oven toward and away from said pattern mount and said pattern, and a source of heat for said oven, said support including generally parallel arms that are pivoted to said frame and are pivoted to said oven, the pivots for said arms being disposed so the generally vertical axis of said oven is directed away from said operator's position whenever said oven is spaced away from said pattern mount and said pattern.

2. In a shell molding machine that can be operated to apply admixed binder and sand to a heated pattern to form a shell mold and wherein that shell mold is cured before it is stripped from said pattern, a frame adjacent which an operator takes his position in operating said machine, a pattern mount to support said pattern, an oven, a support for said oven that moves said oven toward and away from said pattern mount and said pattern, and a source of heat for said oven, said support including a pair of pivots carried by said frame and a pair of arms and a pair of pivots carried by said oven, said arms extending between said pairs of pivots, one of said frame-carried pivots being spaced laterally away from said pattern mount and being disposed at the approximate level to which one of said oven-carried pivots moves when said support moves said oven toward said pattern mount, the other of said frame-carried pivots being spaced laterally away from said pattern mount a greater distance and being disposed above the level of the first said frame-carried pivot, the arm connected to said other frame-carried pivot being shorter than the other of said arms whereby said oven shifts from a position inclined away from said operator's position to a substantially horizontal position as said support moves said oven toward said pattern mount.

3. In a shell molding machine that can be operated to apply admixed binder and sand to a heated pattern to form a shell mold and wherein that shell mold is cured before it is stripped from said pattern, a pattern mount to support said pattern, an oven, a support for said oven that moves said oven toward and away from said pattern mount and said pattern, and a source of heat for said oven, said pattern mount being rotatable about a generally horizontal axis by the shaft of an electric motor, and a safety switch in the energizing circuit of said motor, said switch being responsive to the movement of said oven and being in motor-energizing position only when said oven has been moved away from said pattern.

4. In a shell molding machine that can be operated to apply admixed binder and sand to a heated pattern to form a shell mold and wherein that shell mold is cured before it is stripped from said pattern, a pattern mount to support said pattern, an oven, a support for said oven that moves said oven toward and away from said pattern mount and said pattern, and a source of heat for said oven, said pattern mount being rotatable about a generally horizontal axis by the shaft of an electric motor, and a safety switch in the energizing circuit of said motor, said switch having the actuator thereof in the path of said support whereby said actuator is struck by said support whenever said oven is moved away from said pattern, said switch shifting its contacts to motor-energizing position whenever the actuator thereof is struck.

5. In a shell molding machine that can be operated to apply admixed binder and sand to a heated pattern to form a shell mold and wherein that shell mold is cured before it is stripped from said pattern, a pattern mount to support said pattern, an oven, a support for said oven that moves said oven toward and away from said pattern mount and said pattern, and a source of heat for said oven, said support including a spring to urge said oven away from said pattern mount and an air cylinder to overcome the force of said spring and move said oven adjacent said pattern mount.

6. In a shell molding machine that can be operated to apply admixed binder and sand to a heated pattern to form a shell mold and wherein that shell mold is cured before it is stripped from said pattern, a pattern mount to support said pattern, an oven, a support for said oven that moves said oven toward and away from said pattern mount and said pattern, and a source of heat for said oven, said support including a crank arm and a spring and an air cylinder, said spring acting upon said crank arm to urge said oven away from said pattern mount, said air cylinder acting upon said crank arm to overcome the force of said spring and move said oven adjacent said pattern mount, said crank and said spring being mounted to apply substantially maximum torque whenever said oven is adjacent said pattern mount.

7. In a shell molding machine that can be operated to apply admixed binder and sand to a heated pattern to form a shell mold and wherein that shell mold is cured before it is stripped from said pattern, a pattern mount to support said pattern, an oven, a support for said oven that moves said oven toward and away from said pattern mount and said pattern, a source of heat for said oven, stripper pins to separate said mold from said pattern, and an air cylinder to move said stripper pins, said support including a spring that urges said oven away from said pattern mount, said spring acting to move said oven clear of said pattern before the air in said air cylinder can move said stripper pins.

References Cited in the file of this patent

UNITED STATES PATENTS

| 723,654 | Curtiss | Mar. 24, 1903 |
| 2,607,287 | Price | Aug. 19, 1952 |
| 2,637,549 | Borden | May 5, 1953 |
| 2,724,158 | Davis | Nov. 22, 1955 |
| 2,733,489 | Dahmer | Feb. 7, 1956 |

FOREIGN PATENTS

| 728,108 | Great Britain | Apr. 13, 1955 |
| 734,607 | Great Britain | Aug. 3, 1955 |